United States Patent

[11] 3,548,882

[72] Inventor William R. Rinker
  Cuyahoga Falls, Ohio
[21] Appl. No. 806,499
[22] Filed Mar. 12, 1969
[45] Patented Dec. 22, 1970
[73] Assignee The B. F. Goodrich Company
  New York, N.Y.
  a corporation of New York

[54] FLEXIBLE HOSE
  10 Claims, 4 Drawing Figs.
[52] U.S. Cl. .................................. 138/129,
  138/118, 138/132, 138/144, 138/145, 138/150,
  156/187
[51] Int. Cl. ..................................... F16l 11/04,
  F16l 11/08
[50] Field of Search.......................... 138/129,
  118, 122, 132, 140, 144, 145, 137, 150, 154, 141;
  156/173, 187, 430

[56] References Cited
  UNITED STATES PATENTS
  2,353,494 7/1944 Patten........................... 138/129X
  2,468,589 4/1949 Cryor............................ 138/137X
  2,748,805 6/1956 Winstead...................... 138/144
  2,960,753 11/1960 Robertson..................... 156/187X
  3,033,724 5/1962 Stakes........................... 138/129X
  FOREIGN PATENTS
  854,608 11/1952 Germany...................... 138/150

Primary Examiner—Herbert F. Ross
Attorneys—W. A. Shira, Jr. and Harold S. Meyer

ABSTRACT: A flexible hose of generally thin wall construction of the type used for suction and open end pressure discharge, the hose being formed of a helical wrapping of a generally flat plastic ribbon having a core surrounded by a jacket with the core formed of material of greater stiffness than the jacket. The helical wrapping is such that the ribbon is disposed with the core of adjacent pitches axially overlapping.

PATENTED DEC 22 1970　　　　　　　　　　　　3,548,882

INVENTOR.
WILLIAM R. RINKER
BY
W. A. Shira, Jr.
ATTY.

FLEXIBLE HOSE

BACKGROUND OF THE INVENTION

In the manufacture and commercial use of lightweight flexible hose used for suction or open end discharge, it has been difficult to provide a hose of unitary construction and of long length which is sufficiently flexible to be coiled on a small radius and yet sufficiently rigid and rugged to withstand crushing loads and mechanical abuse in service.

Hose of this type has commonly been formed of wire-reinforced, elastomeric material and/or extruded plastic material having a helically disposed reinforcement therein. In order that the weight of such hose be kept to a minimum, to render the hose capable of being handled easily in long lengths, the wall thickness has been kept sufficiently thin that the hose was capable of withstanding only modest positive pressures, as for example, open end discharge and suction pumping. When the wall thickness of the hose is governed only by these latter two factors, the hose resulting from such design is quite flexible; however, it is often difficult to maintain the hose cross-sectional shape and to prevent it from collapsing under suction.

Various expedients have been tried, generally unsuccessfully, to further reinforce the wall of the hose without an increase in the thickness of the hose wall. Increasing the thickness of the hose wall to prevent collapse of the cross section has been tried; however, this has resulted in a heavier, generally stiffer and less flexible hose which did not lend itself readily to coiling and ease of handling.

This problem, of increased strength without loss of flexibility, has been particularly acute in the design and manufacture of lightweight flexible plastic hose having very little or no wire or other metallic reinforcement in the wall. Hose of this type has a generally resilient cross section which will withstand local indentation and service abuse, however, when the hose is inadvertently kinked, the cross section is permanently damaged and generally unstable in the kinked area, such that it is thereafter subject to collapse under suction pumping. In addition, plastic hose tends to be generally stiffer and more resistant to coiling than elastomeric hose when cold and is thus more apt to be damaged when coiled tightly. The problem of kinking has resulted in plastic hose of heavier wall thickness than is generally required to withstand only the low gauge-pressure and suction loads to which the hose is to be subjected. This has resulted in heavier hose for a given service application with an attendant higher material cost per unit length, and thus has decreased the relative competitive position of plastic hose, as compared to lightweight flexible elastomeric hose for suction and open end discharge service.

SUMMARY OF THE INVENTION

The present invention solves the above described problems by providing an inexpensive, lightweight and flexible plastic hose which is suitable for positive pressure open end discharge and suction pumping usage and is more resistant to kinking than prior constructions. The present hose employs a unique, unitary structure of plastic material having portions of greater stiffness disposed in the wall of the hose in a helical arrangement with adjacent pitches axially overlapping. This structure is attained by wrapping a generally flat ribbon of heated plastic in a helix thereby forming a continuous hose. The plastic ribbon is of generally elongated flat cross section and has a core encased in a jacket, with the core material of greater stiffness than the jacket material. The core is disposed within the ribbon such that the core is generally not less than three-fourths the width of the ribbon. Thus, when the ribbon is wrapped in a helical manner with the core in adjacent pitches overlapping, there is no direct radial path through the wall of the hose between the core convolutions. Hence, the softer plastic between adjacent convolutions of the core is subject to shear when the hose is flexed or subject to internal pressure, so that there is greater resistance to positive internal pressure and to crushing or kinking than in prior constructions.

DETAILED DESCRIPTION

Figure 1:
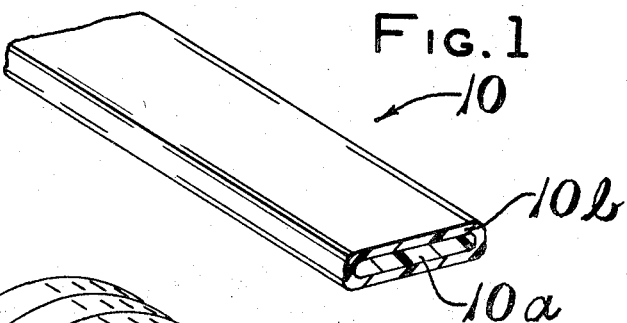
FIG. 1 is a perspective view of a portion of the presently preferred form of the plastic ribbon as it appears before it is helically coiled to produce the hose.

Referring now to FIG. 1, plastic ribbon 10, suitable for forming the improved hose, is shown as having an elongated, generally flat, transverse cross section comprising a core 10a surrounded by a jacket 10b. In the present form of the invention the core 10a and jacket 10b are both formed of a plastic material with the core having a greater stiffness than the jacket 10b. Preferably, the jacket 10b is formed of plasticized polyvinyl chloride and the core 10a is of polyvinyl chloride containing either no plasticizer or an amount less than that in the jacket. The ribbon may be produced by extruding from a common die, plastic material of the different compositions, or by feeding materials of the different compositions through calender rolls, or by any other technique commonly known in the art of preparation of dual hardness plastic materials.

In the preferred form of the invention, the ribbon has the core extending transversely an amount not less than three-fourths the width of the ribbon. The ribbon is preferably three times as wide as it is thick and the thickness of the ribbon, for hose having a diameter in excess of 3 inches, is generally not greater than one-twentieth of the inside diameter of the hose. The ribbon thickness is preferably not greater than one-tenth the inside of the diameter of the hose for sizes of hose less than 3 inches in diameter.

Figure 2:
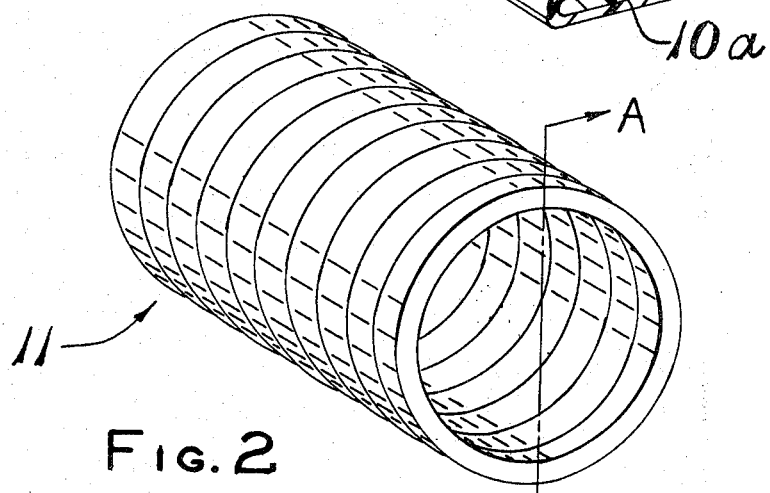
FIG. 2 is a perspective view of a portion of the hose as it appears in completed form.
Figure 3:
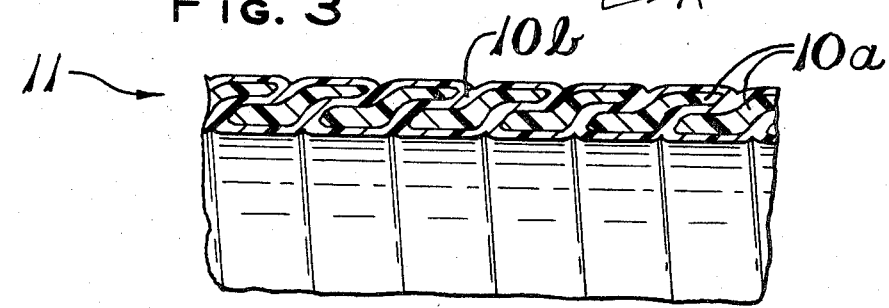
FIG. 3 is a fragmentary sectional view taken along section-indicating line A–A of FIG. 2.

Referring now to FIGS. 2 and 3, the hose 11 is shown in its present form, as it appears as a completed article, having been made by helically winding the plastic ribbon with the adjacent pitches axially overlapping an amount such that a part of the core portion 10b of one pitch axially overlaps a portion of the core of the next adjacent pitch. This provides a structure wherein there is no continuous radial path through the wall of the hose that does not pass through at least one thickness of the core of the ribbon, thereby providing a continuous reinforcement in the hose wall. Preferably the amount of overlap is not less than one-third the width of the ribbon.

Figure 4:
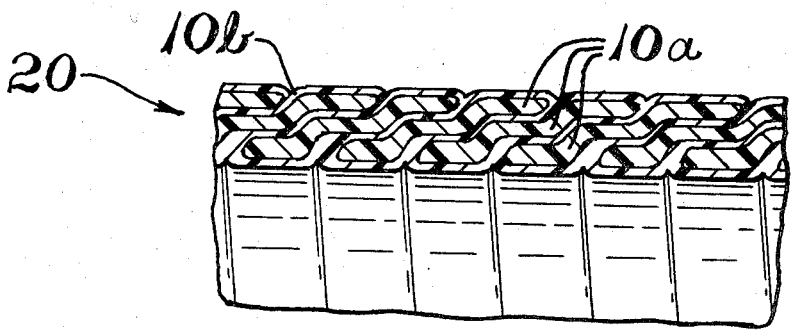
FIG. 4 is a view similar to FIG. 3 of another embodiment of the invention involving multiple overlapping of adjacent pitches of the ribbon.

The thickness of the hose wall is controlled by the thickness of the ribbon, the extent of overlap thereof and by the amount of compression of the overlapping pitches of the ribbon while the plastic is in the heated state. Preferably the radial pressure on the overlapping pitches during winding is such that the core portions attain a slightly S shaped configuration within the wall of the hose, as shown in FIGS. 3 and 4, while the external surfaces of the ribbon are generally flattened to produce a substantially smooth continuous surface of the more plastic material of the hose. Furthermore, if internal support to the ribbon is provided during winding, a smooth bore hose may be obtained quite readily.

The hose may be formed by winding the ribbon about mandrels. In particular, the hose may be formed by winding the ribbon over spaced rotating mandrels and the wall thickness controlled by a pressure roller on the external surface of the hose in a manner set forth in my copending application entitled METHOD AND APPARATUS FOR MAKING PLASTIC HOSE, filed Jan. 21, 1969, Ser. No. 792,496.

Referring now to FIG. 4, the numeral 20 designates a hose which is another embodiment of the invention. In this embodiment the ribbon is formed of a wider and generally thinner cross section than that employed in the hose 10, and the ribbon is wound with a greater degree of axial overlapping. In the illustrated embodiment, three successive adjacent axial pitches of the ribbon have portions of their cores overlapping. This multiple overlapping provides a structure in which any continuous radial path through the hose wall passes through at least three layers of the stiff core material. The embodiment of FIG. 4 thus produces a greater rigidity of the hose and provides greater resistance to kinking, crushing and internal pressure. Although overlapping of three axially adjacent pitches has been shown, it should be apparent that more than three pitches may be axially overlapped by making the ribbon sufficiently thin and wide such that the desired number of layers of overlapping ribbon core may be provided in the hose wall.

The structure of the embodiment of FIG. 4 has greater resistance to collapse of the cross section from kinking and to either positive or reduced pressure, yet the softer plastic of the ribbon jacket 10b, permits the axially overlapping ribbon cores 10a to yield under shearing forces when the hose is flexed. Therefore, the hose of FIG. 4 has greater section stability with a minimum of increase in flex stiffness.

Although the specifically illustrated and described embodiments have been declared as formed of plastic material, it will be apparent that other materials may be employed and the invention is capable of modification and adaptations by those having ordinary skill in the art, the scope of the invention being more particularly defined by the attached claims.

I claim:

1. A flexible hose the wall of which comprises a continuous ribbon extending in a helical path, said ribbon having a reinforcement core surrounded by a jacket, adjacent pitches of the reinforcement having portions in radially spaced overlapping relationship, the regions between adjacent pitches of the reinforcement helix occupied by the jacket material which is more flexible than that of the reinforcement.

2. The hose defined in claim 1 wherein the inner and outer surfaces of the hose are covered by a material more flexible than that of the reinforcement.

3. The hose as defined in claim 1, wherein the material between adjacent pitches of the helix is the same as that covering the inner and outer surfaces of the hose.

4. The hose as defined in claim 3, wherein the entire hose is made of a synthetic plastic material capable of having its stiffness reduced by the addition thereto of a plasticizer and the said reinforcement contains less plasticizer than that of the material covering the reinforcement.

5. The hose as defined in claim 1, wherein there are a plurality of radially spaced reinforcement portions in each radial section of the hose.

6. The hose as defined in claim 1 wherein the said reinforcement has a generally S-shaped configuration in axial cross section.

7. A flexible hose of generally thin wall construction characterized in that said hose is formed of a continuous generally flat ribbon of plastic having a core surrounded by a jacket with the core formed of material of greater stiffness than the jacket with the ribbon helically wound with adjacent pitches of the helical wrapping united into a continuous hose such that the core of said ribbon is disposed in axially overlapping relationship.

8. The hose defined in claim 7, wherein the said ribbon core extends transversely an amount not less than three-fourths the width of said ribbon and the adjacent pitches of said helical wrapping are axially overlapped by an amount at least one-third the width of said ribbon.

9. The hose defined in claim 7, wherein the thickness of said ribbon is not greater than one-twentieth the inside diameter of said hose for hoses greater than three inches in diameter and not greater than one-tenth the inside diameter for hoses less than 3 inches in diameter.

10. The hose defined in claim 7, wherein said ribbon has its width not less than three times its thickness.